A. NEVIN.
Improvement in Dinner-Pails.
No. 133,113.  Patented Nov. 19, 1872.
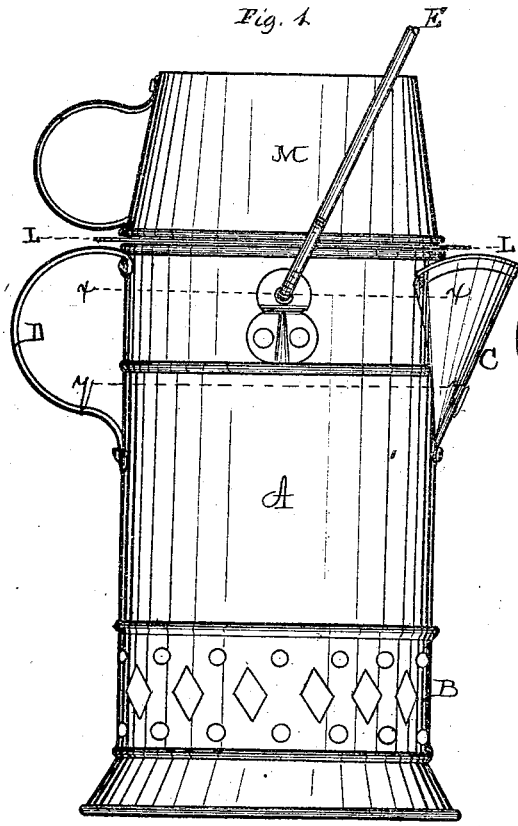
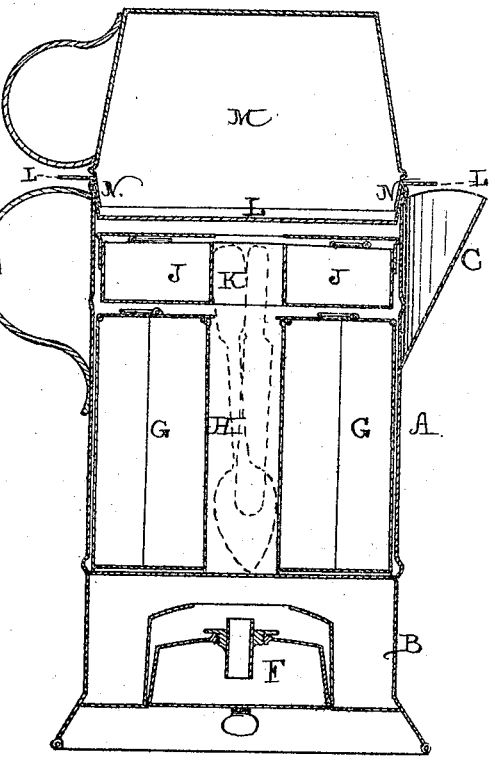
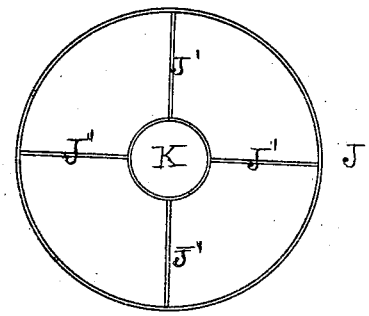
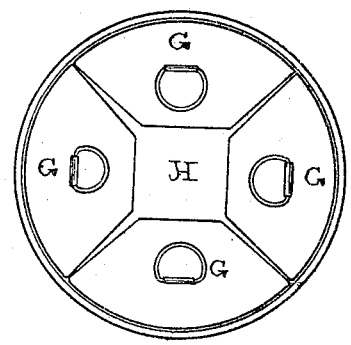
Witnesses:
Harry M. Niederstein
Jacob E. Schiedt
Inventor:
Alfred Nevin,
by John A. Niederstein,
Atty.

UNITED STATES PATENT OFFICE.

ALFRED NEVIN, OF PHILADELPHIA, PENNSYLVANIA, ASSIGNOR TO DAVID J. NEVIN AND ELISHA CROWELL, OF SAME PLACE.

IMPROVEMENT IN DINNER-PAILS.

Specification forming part of Letters Patent No. 133,113, dated November 19, 1872.

*To all whom it may concern:*

Be it known that I, ALFRED NEVIN, of the city and county of Philadelphia, and State of Pennsylvania, have invented a new and useful Portable Kitchen; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1 is a side view of the device illustrating my invention; Fig. 2 is a central vertical section thereof; Fig. 3 is a horizontal section in line $xx$, Fig. 1; and Fig. 4 is a horizontal section in line $yy$, Fig. 1.

Similar letters of reference indicate corresponding parts in the several figures.

This invention relates to a device for preparing or warming and conveying coffee and food generally. It consists of certain receptacles so constructed as to leave spaces for the insertion of spoons, knives, &c. It also consists in a flanged cup and a plate which forms the top of the kettle. It also consists of several parts to form a portable apparatus for preparing or warming and conveying food.

Referring to the drawing, A represents a coffee pot or kettle mounted on a base, B, and provided with spout C, handle D, and bail E. The base leaves a space below the bottom of the kettle, and in this space is suspended a suitable lamp, F, for heating coffee, food, or other articles placed in the kettle; and it is evident that said articles therein will be readily warmed, boiled, or cooked by simply lighting the lamp, the heat of which is deflected against the bottom of the kettle, and the smoke escaping through the perforations in the base B. G represents receptacles for coffee, tea, cream, sugar, oysters, or other articles to be carried. These receptacles consist of suitable boxes with lids or covers and of such shape that when their sides are placed together a space, H, will be formed centrally, as shown in Fig. 4, and in this position the receptacles will be placed in the kettle A, when not otherwise occupied, and rest on the bottom thereof. Within the kettle is also introduced a box, J, which has a series of partitions, J', for various spices, and a central opening in the bottom and lid leaving a space, K, which corresponds with the space H of the receptacles G. L represents a plate, which forms the top of the kettle, both in transportation and usage. M is a drinking-cup, whose upper rim forms a flange, N, which fits snugly in the plate L, so that as the plate rests firmly on the kettle and the cup on the plate the parts are prevented from accidental displacement. When the two parts are together the handle of the cup, in a measure, acts as a handle for the plate and assists the removal and application of the latter.

The plate L, in addition to acting as a tray or holder for food, may also be employed to warm or cook articles, the steam from the fluid in the kettle forming the heating medium.

When the receptacle G, box J, plate L, cup M, and knives, forks, &c., are in proper location, the device is in compact form for transportation, and when required for use the receptacles and spice-box are removed, the fluid or food is introduced into the kettle, the lamp is lighted, and the warming or cooking operation may then be performed.

Having thus described my invention, what I claim as new, and desire to secure by Letters Patent, is—

1. In combination with the kettle A, the receptacles G and spice-box J constructed with the central spaces H and K, substantially as and for the purpose set forth.

2. The flanged cup M and covering-plate L, in combination with the kettle A, substantially as and for the purpose set forth.

3. The receptacles G, spice-box J, covering-plate L, cup M, and lamp F, in combination with the kettle A, substantially as and for the purpose set forth.

The above signed by me this 18th day of September, 1872.

ALFRED NEVIN.

Witnesses:
JOHN A. WIEDERSHEIM,
HARRY M. WIEDERSHEIM.